Oct. 19, 1937. F. DUSTAN Re. 20,533

SCREEN PLATE FOR PAPER MAKING MACHINES

Original Filed Oct. 3, 1934 3 Sheets-Sheet 1

Inventor
Frank Dustan.
By Attorneys.
Southgate Fay & Hawley

Oct. 19, 1937. F. DUSTAN Re. 20,533
SCREEN PLATE FOR PAPER MAKING MACHINES
Original Filed Oct. 3, 1934 3 Sheets-Sheet 2
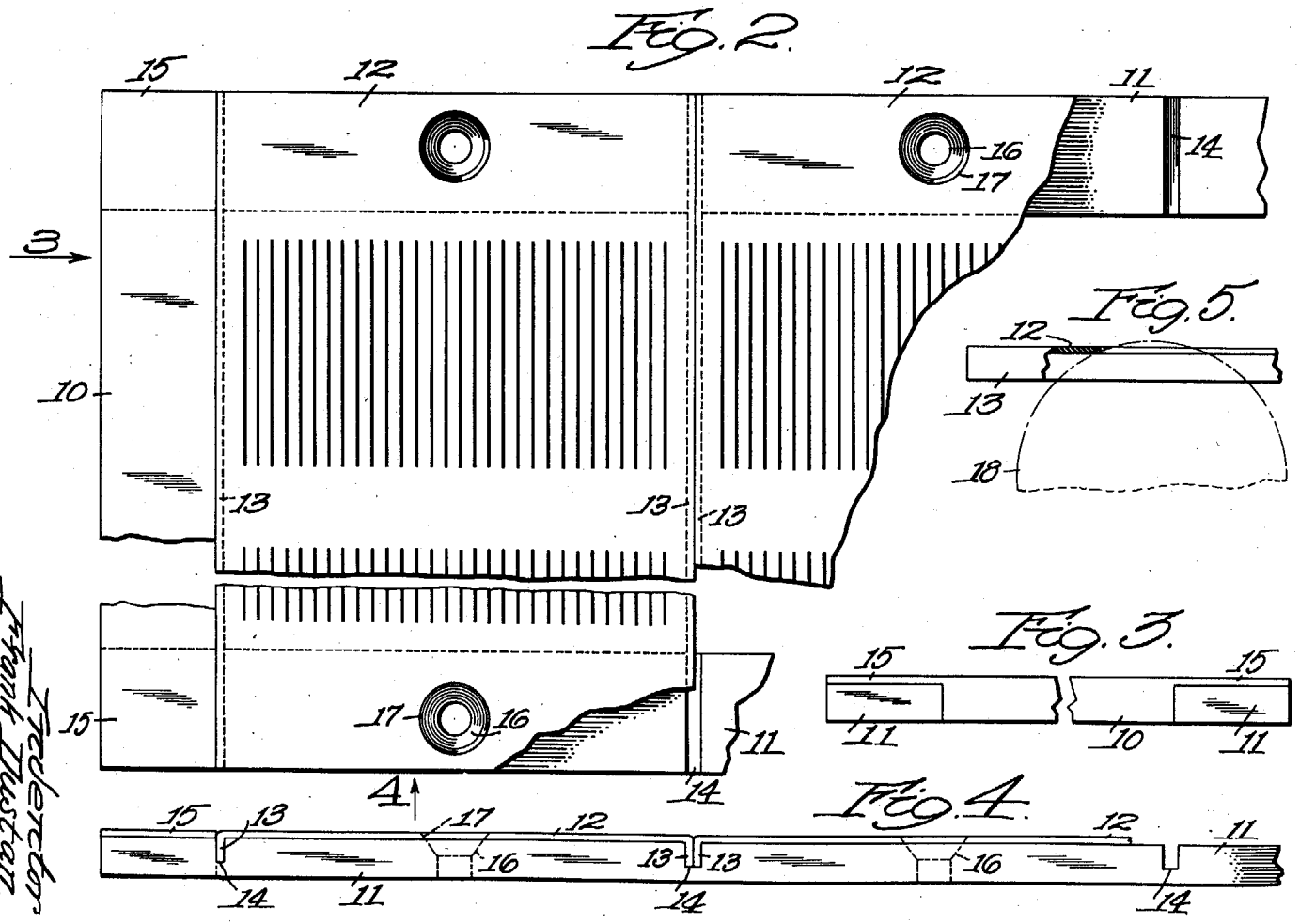
Inventor
Frank Dustan
By attorneys
Soulliyde, Fay & Harding Oct. 19, 1937. F. DUSTAN Re. 20,533
SCREEN PLATE FOR PAPER MAKING MACHINES
Original Filed Oct. 3, 1934 3 Sheets-Sheet 3
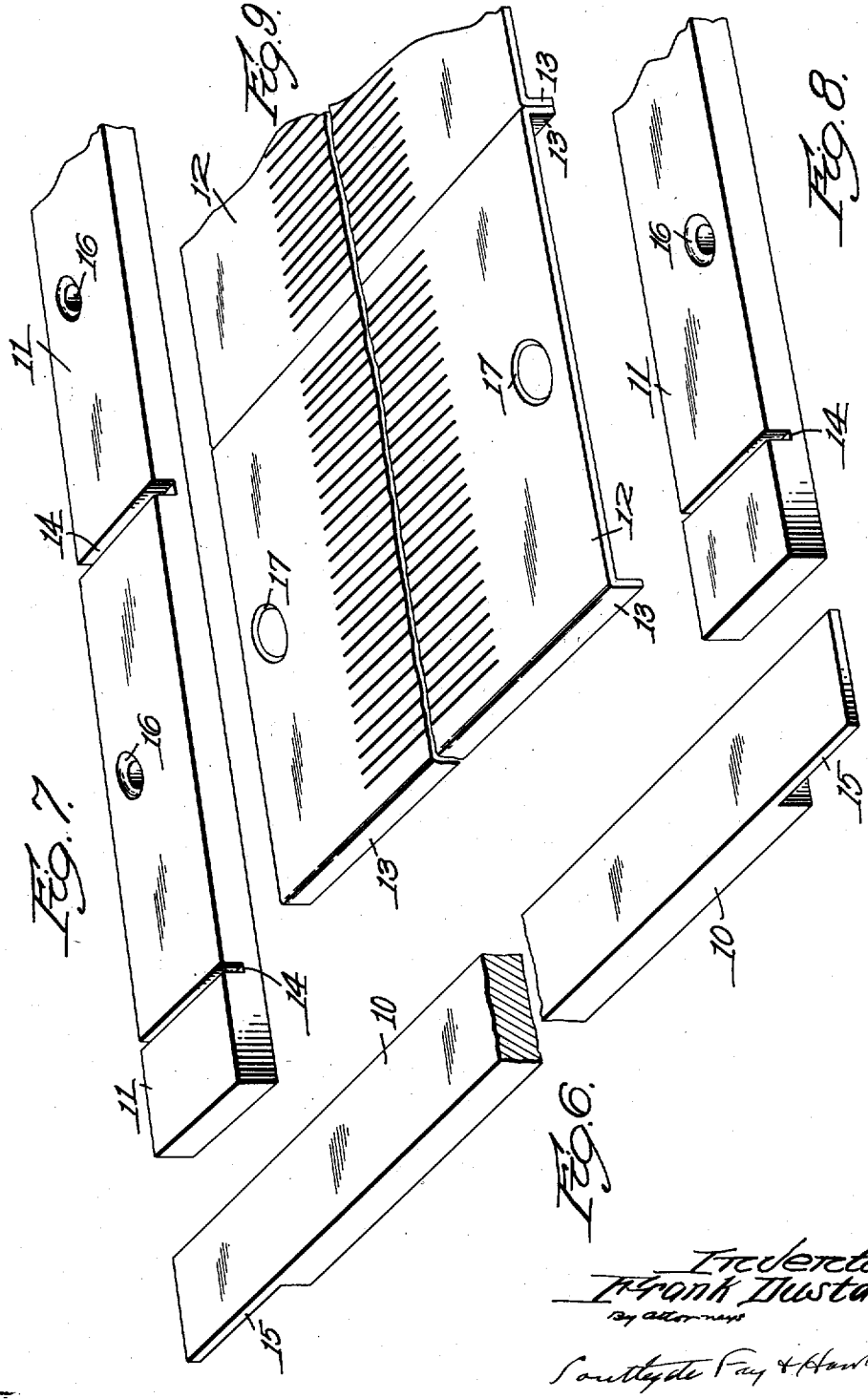
Inventor.
Frank Dustan.
By Attorneys
Courtlyde Fay & Hartley Reissued Oct. 19, 1937

Re. 20,533

UNITED STATES PATENT OFFICE 20,533

SCREEN PLATE FOR PAPER MAKING MACHINES

Frank Dustan, Rochester, N. Y., assignor to William A. Hardy & Sons Co., Fitchburg, Mass., a corporation of Massachusetts Original No. 2,015,141, dated September 24, 1935, Serial No. 746,688, October 3, 1934. Application for reissue February 24, 1937, Serial No. 127,531

8 Claims. (Cl. 92—30)

The principal objects of this invention are to provide a screen plate for a paper making machine adapted to be used in the ordinary way, the top of which is composed of a flat flush horizontal surface throughout its area; to provide a plate made of thin sheets of stainless steel or other non-corrosive metal made in sections and obtaining the necessary rigidity by the bending down of the edges of each plate to make it a channel; to provide the channels extending clear across the screen plate; to increase the strength by arranging the channels to lap over the side members of the frame of the screen plate; to provide additional strength by notching the side members of the frame to fit said flanges where they project over said side members, thus producing a much stronger union between the channels and the frame than has been the case heretofore; to provide a screen plate without projecting surfaces directly adjacent the underside of the narrow screening slits; to provide a construction of channel in which the slits can be machined after the metal has been pressed into channel form, and to provide an improved method of manufacture in accordance therewith.

Other objects and advantages of the invention will appear hereinafter.

Reference is to be had to the accompanying drawings, in which

Fig. 2 is a similar view on enlarged scale;

Fig. 3 is an elevation in the direction of the arrow 3 in Fig. 2 of the end piece of the frame;

Fig. 4 is an elevation taken in the direction of the arrow 4 in Fig. 2, showing the construction of the side sill;

Fig. 5 is a sectional view of one of the channels, showing the slitting operation;

Fig. 6 is a perspective view of the end member shown in Fig. 3;

Fig. 7 is a perspective view of the side sill shown in Fig. 4;

Fig. 8 is a perspective view of the opposite side sill, and

Fig. 9 is a perspective view of a plurality of channel sections assembled together and ready to be assembled with the side and end sills.

Figure 1:
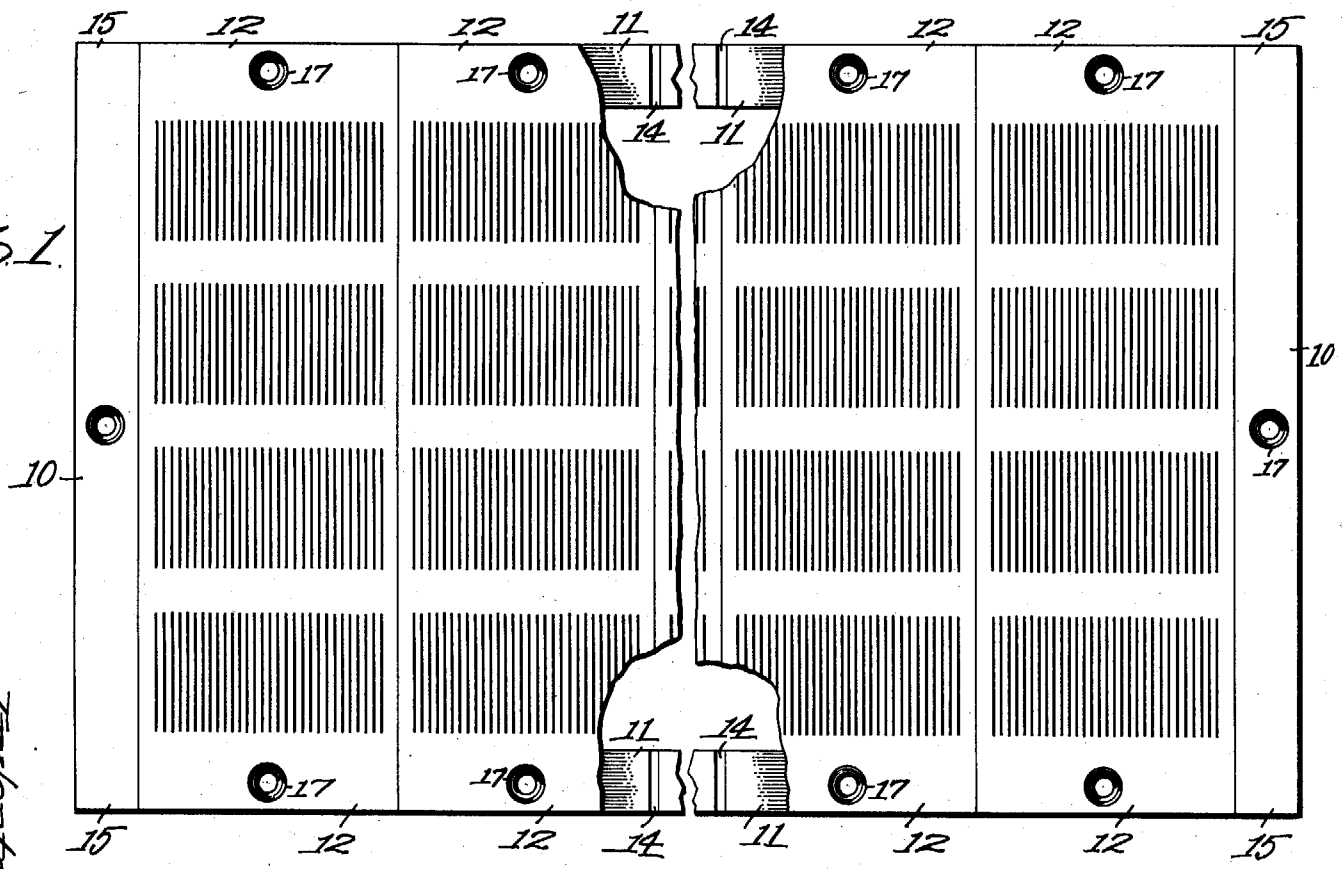
Fig. 1 is a plan of a screen plate made up of a plurality of channel sections in accordance with this invention, with parts broken away to show interior construction.

In using a screen plate the pulp flows over the screen and is drawn through the slots by means of a diaphragm, not shown. The cast screens heretofore commonly used have been of considerable thickness, about three-eighths of an inch, necessarily, in order to give them the requisite strength. A series of channels or grooves is milled on the under side of the plates, the depth of these grooves extending very nearly to the upper surface of the plate. These grooves are of considerable width at the under surface, tapering or decreasing in width as they extend up into the plate. Fine slits are cut through from the bottom of these grooves to the top surface of the plate, through which the pulp is screened. The function of the metal of the lower portion of the plate between the milled channels is merely to strengthen or sustain the upper slitted screening surface.

The said milled channels are made tapering and broadest at the lower surface of the plate in order that the pulp, after having passed through the narrow slits, may fall away freely; but in practice it is found that the pulp often collects and clogs in these channels, necessitating the removal and cleaning of the plates involving a considerable loss of time and also additional wear and tear on the plates due to the cleaning operation.

The objects and advantages above mentioned are secured in accordance with this invention by making a screen plate having end pieces 10, side sills 11 and pressed metal channel sections 12. The screen portion of the plate consists of a series of these channel sections, each one extending laterally across the entire width of the plate to the outer edges of the side sills 11. These channel sections are pressed into channel shape by bending down the sides to form right-angle flanges 13 and these bent down sides extend throughout the length of each channel section and throughout the width of the plate itself. Before they are assembled the sections of this metal are slitted in the manner indicated in Fig. 5 by sawing through the web from the flange side. The side sills and ends make a rectangular frame on which these channels are mounted. The side sills are provided with transverse notches 14. The end notches are of a single width, that is, the same width as the thickness of the metal of the sections 12 and the intermediate ones of twice that width.

The flanges of the several channels are spot welded together along adjacent vertical surfaces of the down turned flanges 13 to form a single structure. These flanges are set into the notches 14 and the channels are spot welded to the side sills at each end of each channel, the metal of the side sills between the notches 14 constituting a reinforcing means between and abutting the flanges 13 of each section, to stiffen the plate additionally and prevent its bending or buckling. The end members 10 are similarly welded to the side sills.

At each corner each end member is provided with a projecting part 15 which is the same thickness as the channel webs. When these projections 15 are lapped over the side sills 11 the top surfaces of the end members 10 will be flush wilth the top surfaces of the channels. Thus the entire top surface of the screen plate will be in a single plane without projections of any kind above it. Countersunk holes 16 are shown extending through the side sills with corresponding holes 17 in the channels to receive the screws by which the assembled screen plate is secured in the vat. These screws secure the entire screen plate in position and are not depended upon for holding together any two members of the screen plate.

In Fig. 5 the operation of the saws 18 used in cutting the slits is shown. This is done after the sheet metal has been pressed into channel shaped sections.

By this construction it will be seen that the screen plate is used in the ordinary way and the screen surfaces can be made of thin sheets of stainless steel or other non-corrosive metal or alloy instead of castings. This eliminates a great waste. The entire weight of one of these screen plates is only about 16 pounds. In the old form the original casting of bronze weighed about eighty pounds and more than half of it had to be cut away in the finishing processes, thus reducing a large percentage of the original casting to scrap metal as well as increasing the cost of machining. Of course, in this case the channels themselves do not have to be machined except for the slitting and the cutting of the holes 17.

By this construction a plate has all the rigidity that can be secured from a cast plate because the supporting cross flanges of the sections and the method of securing the end and side members more than make up for the fact that in the cast plate there is a much greater thickness of metal.

By this construction no surfaces directly adjacent to the underside of the narrow screen slits are provided which heretofore have resulted in the collection of pulp and the clogging of the slits. Therefore, plates of this character do not have to be taken out and cleaned as often as has been the case heretofore.

It will be noted that the horizontal surface of the channels and in fact the whole of the plates are perfectly flat and level. The channels extend clear across the plate lapping over the side sills and their flanges fit into notches machined in the side sills. This makes the top surfaces flush over the entire plate and results in a much stronger junction between the channels and the frame.

Having thus described my invention and the advantages thereof, I do not wish to be limited to the details herein disclosed, otherwise than as set forth in the claims, but what I claim is:

1. As an article of manufacture, a screen plate for the purpose described, comprising a pair of side sills having notches across their upper surfaces, a pair of end pieces provided with projecting ends extending over the side sills at the corners of the structure and secured thereto, and screen sections of thin metal having their side edges turned down vertically to form flanges, said flanges resting in said notches and secured thereto, the tops of the end pieces including the end extensions being flush with the surfaces of the channel sections and the extreme ends thereof being flush with the ends of the channel sections and with the outer sides of said sills.

2. As an article of manufacture, a screen plate for the pupose described, comprising a pair of side sills having notches in the tops thereof, a pair of end pieces provided with projecting ends extending over the side sills at the corners of the structure and secured thereto, and screen sections of thin metal having their side edges turned down vertically to form flanges, said flanges extending into said notches and secured thereto, the flanges of each section abutting those of the adjacent ones and the flanges of the end sections abutting the end pieces, said flanges being secured on their surfaces to the members against which they abut.

3. As an article of manufacture, a screen plate for the purpose described, comprising a pair of side sills, a pair of end pieces, a plurality of sections of sheet metal, each provided with two downwardly extending flat, right-angle flanges arranged transverse to the long dimensions of the screen plate, said sections being secured to the side sills, said side sills having notches cut from one side to the other of such width as to receive two of said flanges in juxtarelationship, said flanges being located in said notches abutting those of adjacent sections and extending to the outer sides of the sills, the tops of said sections forming a continuous and substantially unbroken flat surface and the sections being unobstructed therebeneath between the side sills except for said flanges.

4. As an article of manufacture, a screen plate for the purpose described, comprising a pair of side sills, a pair of end pieces, a plurality of sections of sheet metal, each provided with two downwardly extending flat, right-angle flanges arranged transverse to the long dimensions of the screen plate and to said side sills, said sections being secured to the side sills, one flange of each end section contacting with a vertical surface on an end piece, said side sills having transverse notches of such width as to receive two of said flanges in juxtarelationship, the adjacent flanges abutting each other throughout their lengths and the ends being located in abutting relation in said notches, the tops of said sections forming a continuous and substantially unbroken flat surface and the sections being unobstructed therebeneath between the side sills except for said flanges.

5. As an article of manufacture, a screen plate for the purpose described, comprising a pair of side sills, a pair of end pieces, a plurality of sections of sheet metal, each provided with two flat downwardly extending right-angle flanges arranged transverse to the long dimensions of the screen plate, said sheet metal sections and flanges extending transversely across the side sills above the same and secured thereto, the outer surfaces of the flanges of adjacent sections abutting each other whereby the tops of said sections form a continuous and substantially unbroken flat surface, and reinforcing means located beneath both ends of each section and comprising a solid body of metal filling the space beneath the sheet metal section between said flanges thereof and between the edges of the side sill, said sections being unobstructed therebeneath between the side sills except for said flanges.

6. As an article of manufacture, a screen plate for the purpose described, comprising a pair of side sills, a pair of end pieces provided with projecting ends extending over the side sills at the corners of the structure and secured thereto, screen sections of thin metal having their side edges turned down vertically to form right-angle flanges, said flanges extending transversely across the side sills above the same and the screen sections being secured to the side sills, the outer surfaces of the flanges of adjacent sections abutting each other whereby the tops of said sections form a continuous and substantially unbroken flat surface, and reinforcing means located beneath both ends of each section and comprising a solid body of metal filling the space beneath the sheet metal section between the flanges thereof and between the edges of the side sill, the tops of the end pieces including the end extensions being flush with the surfaces of the channel sections and the extreme ends thereof being flush with the ends of the channel sections and with the outer sides of said sills, the sections being unobstructed therebeneath between the side sills except for said flanges.

7. As an article of manufacture, a screen plate for the purpose described, comprising a pair of side sills, a pair of end pieces provided with projecting ends extending over the side sills at the corners of the structure and secured thereto, and screen sections of thin metal having their side edges turned down vertically to form right-angle flanges, said flanges extending transversely across said sills above the same and the screen sections being secured to the sills, the flanges of each section abutting those of the adjacent ones and the flanges of the end sections abutting the end pieces, whereby the tops of said sections form a continuous and substantially unbroken flat surface, and reinforcing means located beneath both ends of each section and comprising a solid body of metal filling the space beneath the sheet metal section between the flanges thereof and between the edges of the side sill, said sections being unobstructed therebeneath between the side sills except for said flanges.

8. As an article of manufacture, a screen plate for the purpose described, comprising a pair of side sills, a pair of end pieces, a plurality of sections of sheet metal, each provided with two downwardly extending right-angle flanges arranged transverse to the long dimensions of the screen plate and to said side sills, one flange of each end section contacting with a vertical surface on an end piece, said flanges extending transversely across the side sills above the same and the sections being secured to the side sills, the outer surfaces of the flanges of adjacent sections abutting each other whereby the tops of said sections form a continuous and substantially unbroken flat surface, and reinforcing means located beneath both ends of each section and comprising a solid body of metal filling the space beneath the sheet metal section between the flanges thereof and between the edges of the side sill, said sections being unobstructed therebeneath between the side sills except for said flanges.

FRANK DUSTAN.